US010749359B2

(12) United States Patent
Ross

(10) Patent No.: US 10,749,359 B2
(45) Date of Patent: Aug. 18, 2020

(54) WORKSTATION POWER SYSTEM

(71) Applicant: VITEC VIDEOCOM INC., Chatsworth, CA (US)

(72) Inventor: Mark Ross, Shelton, CT (US)

(73) Assignee: Vitec Videocom Inc., Chatsworth, CA (US)

( * ) Notice: Subject to any disclaimer, the term of this patent is extended or adjusted under 35 U.S.C. 154(b) by 0 days.

(21) Appl. No.: 14/221,028

(22) Filed: Mar. 20, 2014

(65) Prior Publication Data

US 2014/0344610 A1 Nov. 20, 2014

Related U.S. Application Data

(60) Provisional application No. 61/803,702, filed on Mar. 20, 2013.

(51) Int. Cl.
*G06F 1/26* (2006.01)
*H02J 7/00* (2006.01)
*H02J 9/06* (2006.01)
*H02J 4/00* (2006.01)
*H02J 9/00* (2006.01)
*G06F 1/30* (2006.01)

(52) U.S. Cl.
CPC ............. *H02J 7/0042* (2013.01); *G06F 1/26* (2013.01); *G06F 1/263* (2013.01); *G06F 1/30* (2013.01); *H02J 4/00* (2013.01); *H02J 7/00* (2013.01); *H02J 7/0013* (2013.01); *H02J 7/0063* (2013.01); *H02J 9/00* (2013.01); *H02J 9/061* (2013.01)

(58) Field of Classification Search
CPC .......... H02J 7/0042; H02J 7/00; H02J 7/0052; G06F 1/263; G06F 1/30
See application file for complete search history.

(56) References Cited

U.S. PATENT DOCUMENTS

| | | | | |
|---|---|---|---|---|
| 6,493,220 B1* | 12/2002 | Clark | ..................... | A47B 21/00 248/918 |
| 7,148,807 B2* | 12/2006 | Moro | ................ | H04W 52/0261 340/636.1 |
| 2005/0288571 A1* | 12/2005 | Perkins | ................ | A61B 5/0002 600/407 |
| 2007/0216355 A1* | 9/2007 | Kim | ....................... | H02J 7/0024 320/128 |
| 2009/0276637 A1* | 11/2009 | Coonan | ................ | A61B 5/7475 713/300 |
| 2010/0264738 A1* | 10/2010 | Murtha | .................... | G06F 1/263 307/66 |
| 2011/0273132 A1* | 11/2011 | Khaitan | ................ | H01M 10/46 320/101 |
| 2012/0235485 A1* | 9/2012 | Trock | .................... | H02J 7/0021 307/48 |

(Continued)

*Primary Examiner* — Zahid Choudhury
(74) *Attorney, Agent, or Firm* — Scott R. Zingerman

(57) ABSTRACT

A power system for the electronic devices on a mobile workstation. The power system preferably includes: an enclosure having a mount for a removable battery; circuitry housed in the enclosure for providing electrical power at two or more output voltages for electronic devices on the workstation and for deactivating output power when the battery charge falls below a predetermined level. The power system may also include charging circuitry for recharging the removable battery in-place.

12 Claims, 10 Drawing Sheets

(56) References Cited

U.S. PATENT DOCUMENTS

2014/0344588 A1* 11/2014 Chou ................... G06F 1/30
  713/300
2015/0198989 A1* 7/2015 Hayter .................. G06F 1/263
  713/340

* cited by examiner

WORKSTATION POWER SYSTEM

CROSS REFERENCE TO RELATED APPLICATION

This application claims the benefit of U.S. Provisional Application No. 61/803,702 filed Mar. 20, 2013, herein incorporated by reference in its entirety for all purposes.

BACKGROUND OF THE INVENTION

1. Field of the Invention

The present invention relates generally to power systems for workstation. More particularly, but not by way of limitation, the present invention relates to an intelligent battery system for a workstation.

2. Background of the Invention

Mobile workstations are well known in the art and used in a variety of applications, particularly in environments where it is efficient to take a computer to the point of data collection as opposed to collecting information and later entering it in a computer. This is especially true in medical fields where the automated entry of patient information can improve the quality of care and radically reduce human error. Presently, in the hospital setting, workstations are used regularly to collect patient vital information, automatically dispense drugs, and perform routine maintenance of patient records.

While the use of workstations has become routine, the art of powering such devices is still evolving. Early workstations had to be plugged in to an electrical outlet in each room as the workstation was moved patient-to-patient. Next, permanent batteries found their way on to workstations. Unfortunately, as the batteries became depleted, the workstation had to be plugged in or, worse yet, taken out of service to recharge the batteries. More recently, swappable batteries are becoming common place. Obviously, a system with just a removable battery requires the electronic systems on the workstation to be shut down and restarted before and after a battery swap, respectively. This problem was first addressed by U.S. Pat. No. 7,800,255 issued to Coonan, et al. Coonan suggests using a small permanent battery that can briefly supply power while the larger, swappable battery is exchanged. The small permanent battery is charged by its swappable counterpart.

Further advancements were offered by U.S. application Ser. No. 12/761,792 by Murtha, et al., which is incorporated by reference as if fully set forth herein. Murtha provides two swappable batteries. Power is drawn from the first battery until it is depleted, at which time the system begins drawing power from the second battery. While the second battery is discharging, the first battery may be swapped at the user's leisure. When the second battery is depleted, the system once again draws power from the first battery. Further, the system detects a user's actions to remove a battery and automatically switches to the other battery.

One drawback of such systems is only a single output voltage is provided. Typically a voltage is provided to operate a single workstation system. If other voltages are needed, an inverter and power supply may be used to provide power to other systems. Obviously, in such an arrangement losses are present in both the inverter and power supply.

Another drawback of all of these systems is the lack of a provision for keeping the operator fully aware of the status of each battery and the health of the system in general. It is well known in the art to provide a charge indication on a battery, often called a "fuel gauge" because it resembles the fuel gauge in a car and provides a similar function, namely an indication of the percentage of time left to operate. However, such fuel gauges are not always in plain view of the operator and the operator may not remember to regularly check battery status.

It is thus an object of the present invention to provide a power system for a workstation that provides a remote visual indication of the status of each battery within the system. In addition, the system interfaces with the workstation computer and an application thereon provides the user with system information such as the percentage charge in each battery, the operating time remaining on each battery, the health of the batteries, and the like.

SUMMARY OF INVENTION

The present invention provides a power system for the electronic devices on a mobile workstation. In one preferred embodiment the power systems includes: an enclosure having a mount for a removable battery; circuitry housed in the enclosure for providing electrical power at two or more output voltages for electronic devices on the workstation and for deactivating output power when the battery charge falls below a predetermined level; and a charger for recharging the removable battery in-place, if so desired.

In another preferred embodiment, the present invention includes circuitry for providing a remote display of battery status. In addition to, or alternatively to, the remote display of battery status, the circuitry may provide a standard interface for connection to a computer on the workstation so that battery status may be displayed to the operator on the computer display. The system may additionally provide a provision for aural indications of low charge, a faulty battery, or other problems with the power system. In at least one embodiment, the system utilizes the WONG-BAKER FACES® Pain Scale for indicating battery health.

In another preferred embodiment the present invention provides a power system for a workstation including a mount for a removable battery, a battery for mounting to the mount, circuitry to provide a remote indication of battery status, and a charger for charging the removable battery in-place. In one preferred embodiment, the charger provides enough electrical power to simultaneously charge the battery and power the other electronic systems of the workstation.

DETAILED DESCRIPTION

Before explaining the present invention in detail, it is important to understand that the invention is not limited in its application to the details of the construction illustrated and the steps described herein. The invention is capable of other embodiments and of being practiced or carried out in a variety of ways. It is to be understood that the phraseology and terminology employed herein is for the purpose of description and not of limitation.

Figure 1:
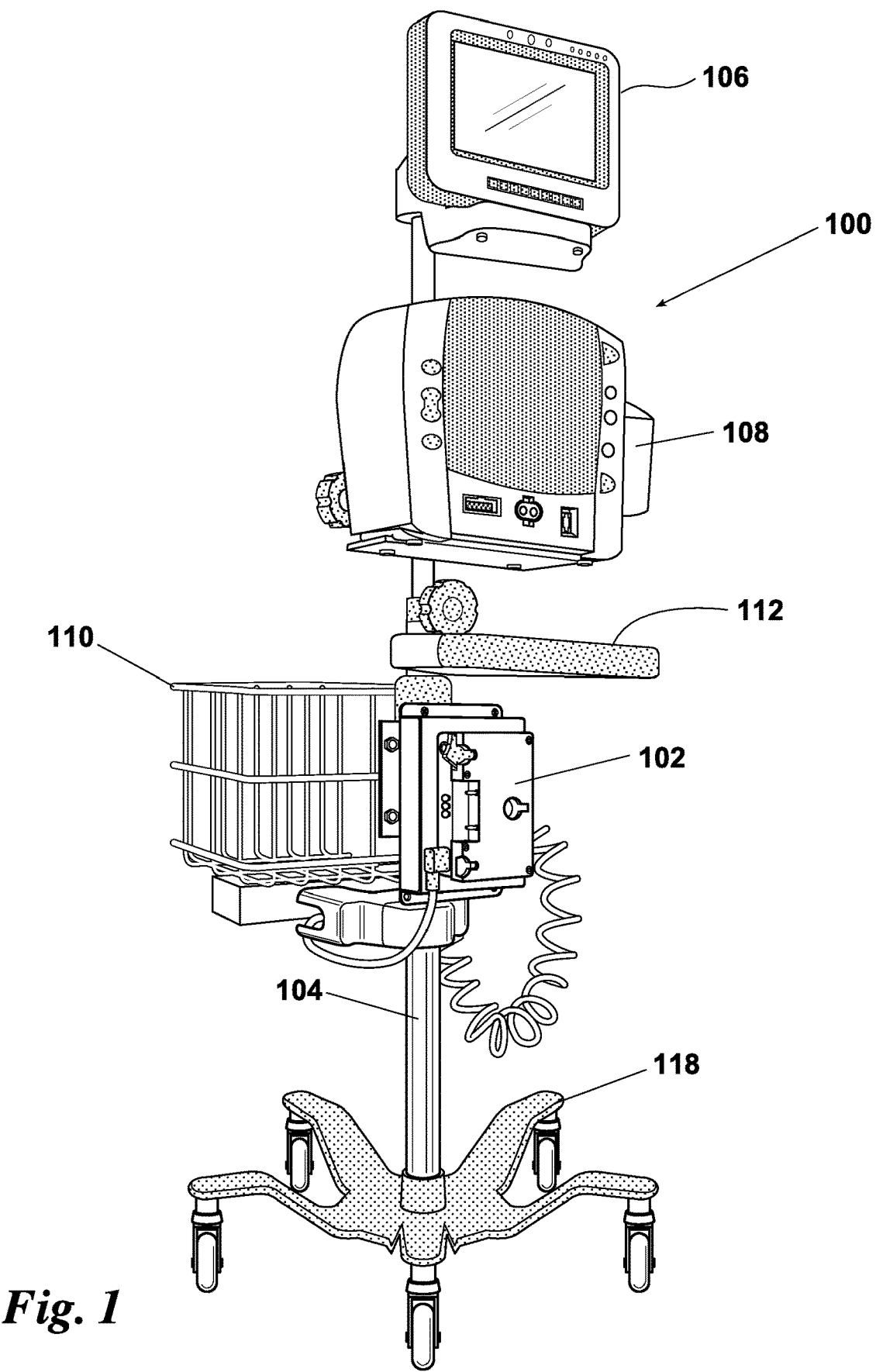
FIG. 1 shows the inventive power system in its general environment.

Referring now to the drawings, wherein like reference numerals indicate the same parts throughout the several views, a workstation 100 with the inventive power system 102 is shown in its general environment in FIG. 1. In a typical installation, workstation 100 includes: a cart, pole, or the like 104; a processing system 106 to provide user interface, communications, data storage, etc.; a system for data collection 108, and a power system 102. Cart 104 will typically include a plurality of wheels 118 (in this example, five wheels), a handle 112 for moving cart 104, and perhaps a basket 110 for carrying sensors, gloves, notebooks, spare batteries, expendable items, etc.

The computer system employed on a workstation of the present invention may be a conventional desktop computer, laptop computer, tablet computer, notebook computer, or the like. Alternatively, the computer system may be specialized for a particular environment such as processing system 106 which is intended for use in a medical environment. One computer suitable for medical environments is the NEURON™ touchscreen platform manufactured by Capsule Tech, Inc. of Andover, Mass. Computer 106 includes software drivers to interface with a variety of medical devices from a variety of manufacturers and to provide a graphical user interface as well as wireless communications to patient management systems.

By way of example and not limitation, in a medical environment, one use for a workstation is the collection of patient vital signs. One system for the collection of vital signs is a CARESCAPE™ model V100 monitor 108 manufactured by General Electric Company of Fairfield, Conn. As will be appreciated by one of ordinary skill in the art, workstations have a variety of uses and thus, by way of example, monitor 108 could be replaced by a system to dispense medications, measure environmental factors, etc. In fact, in some instances, computer 106 may be the only electrical/electronic system on the cart other than power system 102.

Figure 2:
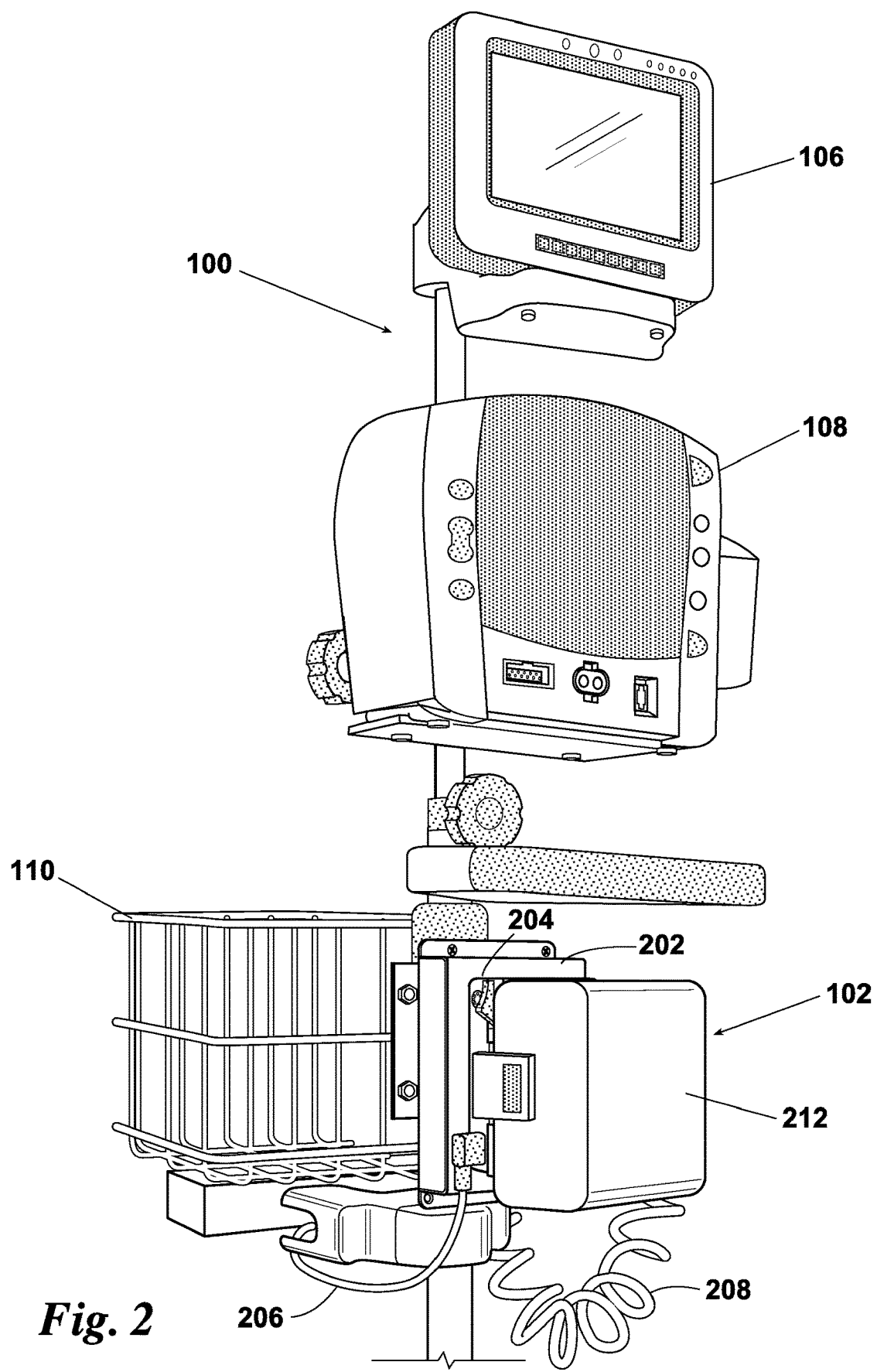
FIG. 2 provides a perspective view from the left front of the inventive power system with a battery mounted.

Turning to FIG. 2, power system 102 includes: housing 202; battery mount 204 attached to housing 202; and interconnects 206 and 208 for providing power to external systems such as monitor 108 and processing system 106 and for exchanging data with external systems such as processor 106. Battery 212 is removably attached to battery mount 204 and provides primary power for operating all of the systems of workstation 100. Housing 202 houses a printed circuit board (not shown in FIG. 2) which performs management of the battery and communication with other systems.

Figure 3:
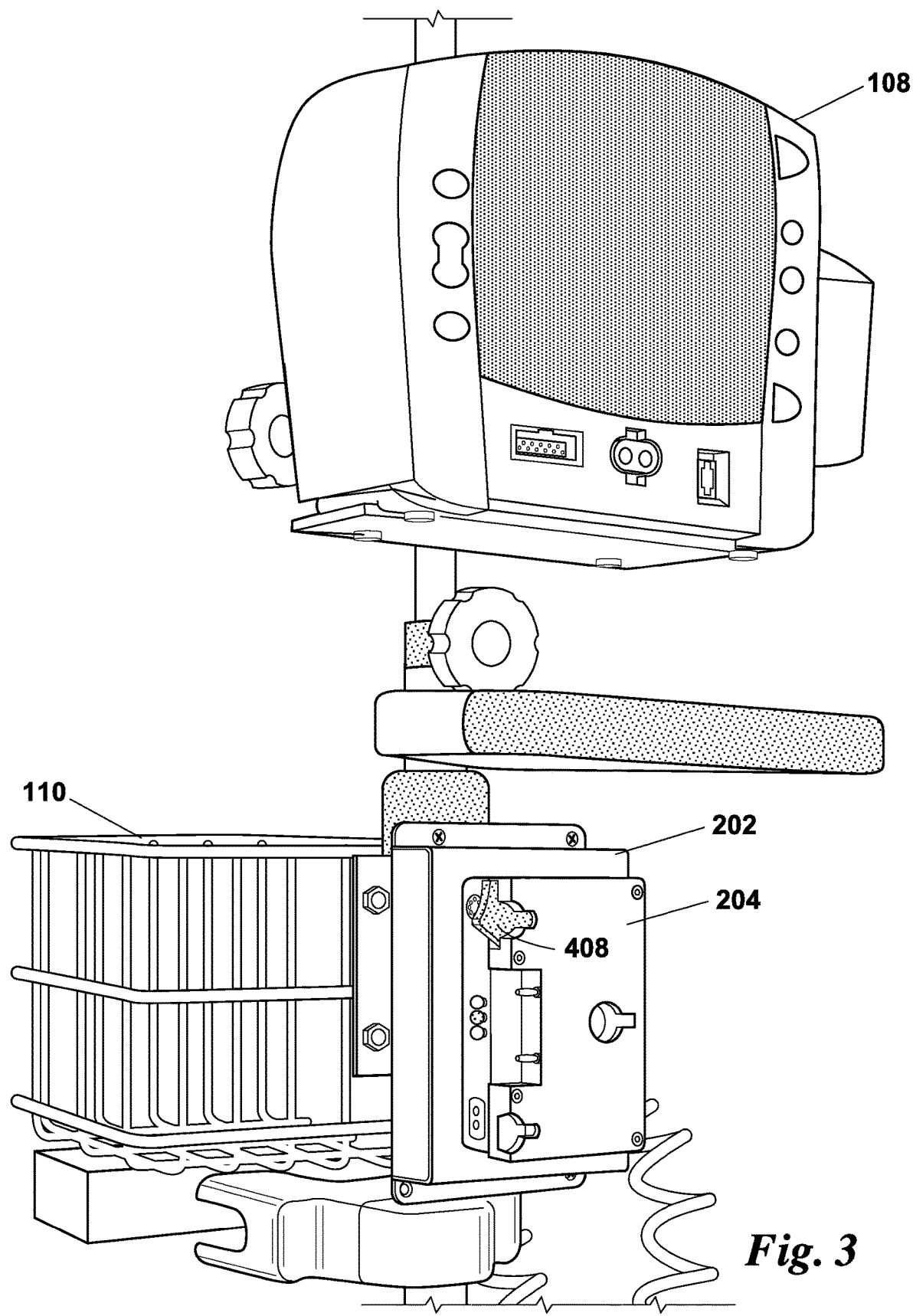
FIG. 3 provides a perspective view from the front left side of the inventive power system without a battery in place.

With further reference to FIG. 3, battery mount 204 is preferably of a type which can accommodate a limited set of batteries. Presently batteries are available of many different chemistries, of wildly varying capacities, and of varying quality. It can be unsafe to blindly charge a battery without regard to these factors, or even to discharge a battery at rates that may cause it to overheat and fail. Thus, the importance of a battery mount which will accommodate a finite set of batteries. Preferably, the circuitry housed in housing 202 has the ability to detect the type and capacity of any battery attached to mount 204 and can apply charge at an appropriate rate over an entire charging cycle, allow discharging to occur at only a safe rate, and keep a tally of the energy remaining in any connected battery.

Figure 4:
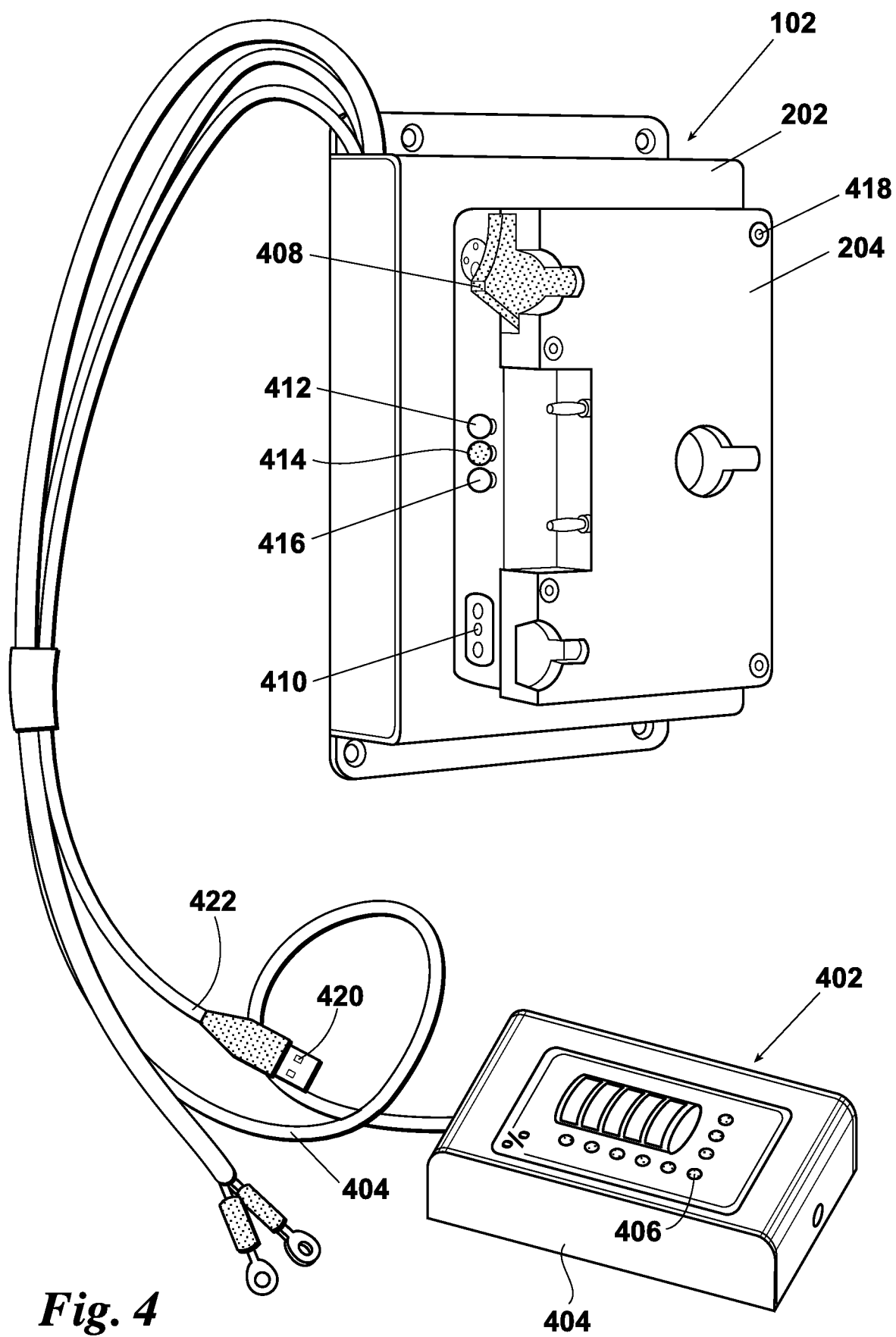
FIG. 4 provides a front perspective view of a preferred embodiment of the remote fuel gauge as employed in the present invention.

Turning next to FIG. 4, in one preferred embodiment, power system 102 includes remote fuel gauge 402 which is connected to the circuitry in housing 202 via cable 404. Fuel gauge 402 includes a housing 404, and a plurality of light emitting diodes 408 (6 shown) for displaying the amount of charge, or time remaining, in the battery in a bar graph-type fashion. As will be apparent to one of ordinary skill in the art, the fuel gauge could alternatively be implemented as an LCD display, vacuum fluorescent display, incandescent display, an analog meter movement, a numeric display, a combination of any of the preceding, or any other means for displaying a remaining charge in the battery, or remaining time to operate, either as an absolute quantity or as a percentage remaining. As will likewise be obvious to one of ordinary skill in the art, when the indication is presented as a percentage, the circuitry of the inventive device must be capable of determining the chemistry and capacity of any connected battery for the indication to be meaningful.

As can also be seen in FIG. 4, preferably battery mount 204 includes a system for latching a battery in place, and a lever 408 for releasing the battery from the mount. Additionally mount 204 may include connector 410 for accessing battery power not subject to the control of the circuitry housed in housing 202. Light emitting diodes 412-416 may indicate the health of the battery and/or charging status. Finally, battery mount 204 is attached to housing 202 with socket head screws 418 (4 shown), although any suitable attachment means capable of supporting the battery weight could be used.

In one preferred embodiment, the inventive power system 102 further includes cable 422 having USB connector 420 for communication with the workstation computer 106 (FIG. 1). Computer 106 would then have software drivers loaded for communication with power system 102 so that battery information and discharge status could be displayed on the user interface as will be discussed in more detail herein below. Further, if computer 106 is equipped with a network connection, typically wireless such as 802.11 (b), (g), or (n), then computer 106 can be configured to forward charge and health information of the batteries to service technicians, the battery manufacturer, or the like.

Figure 5:
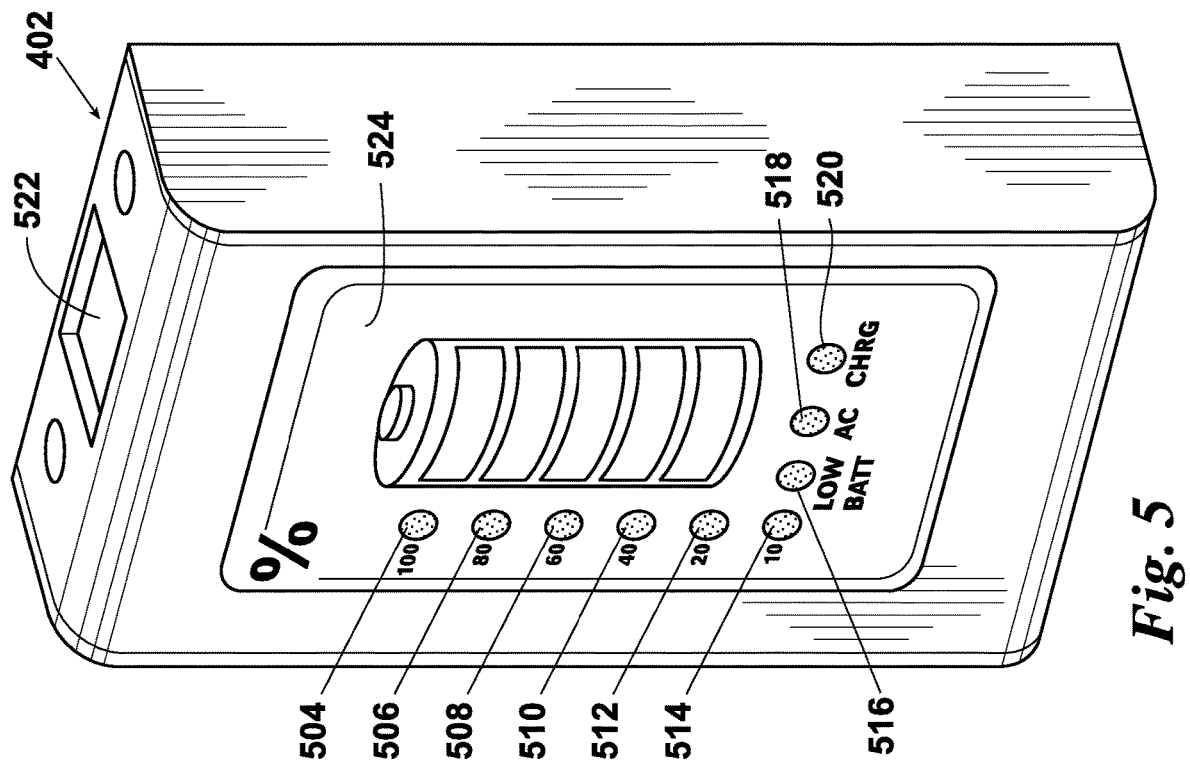
FIG. 5 depicts a remote fuel gauge as used in certain preferred embodiments of the present invention.

As discussed above, the remote fuel gauge can take on a number of different embodiments. Turning to FIG. 5, one preferred embodiment of fuel gauge 402 comprises: housing 502; six light emitting diodes (LEDs) 504-514 indicating the percentage charge remaining in the battery; LED 516 which illuminates to indicate the battery is critically low; LED 518 which indicates that AC electrical power is available for operating the workstation and/or recharging the battery; and LED 520 which indicates the battery is charging. A connector 522 is provided for connecting fuel gauge 402 to power system 102 (FIG. 1). Preferably, graphic overlay 524 is included to provide legends and make operation the fuel gauge 402 intuitive.

As will be apparent to one of ordinary skill in the art, when the battery is fully charged, all six LEDs 504-514 will be illuminated. As the remaining charge in the battery approaches 80%, LED 504 will be extinguished and the remaining LEDs 506-514 will be illuminated. Likewise, as the remaining charge approaches 60%, LED 506 will be extinguished, and so on, until the remaining charge falls below 10% and LED 514 is extinguished and LED 516 is illuminated to indicate there is very little time of operation left. Optionally, LED 516 may be configured to flash at even a lower level of charge to indicate to the operator that only a few seconds remain to properly shutdown the equipment of the workstation, to change the battery, or connect to AC power.

Figure 6:
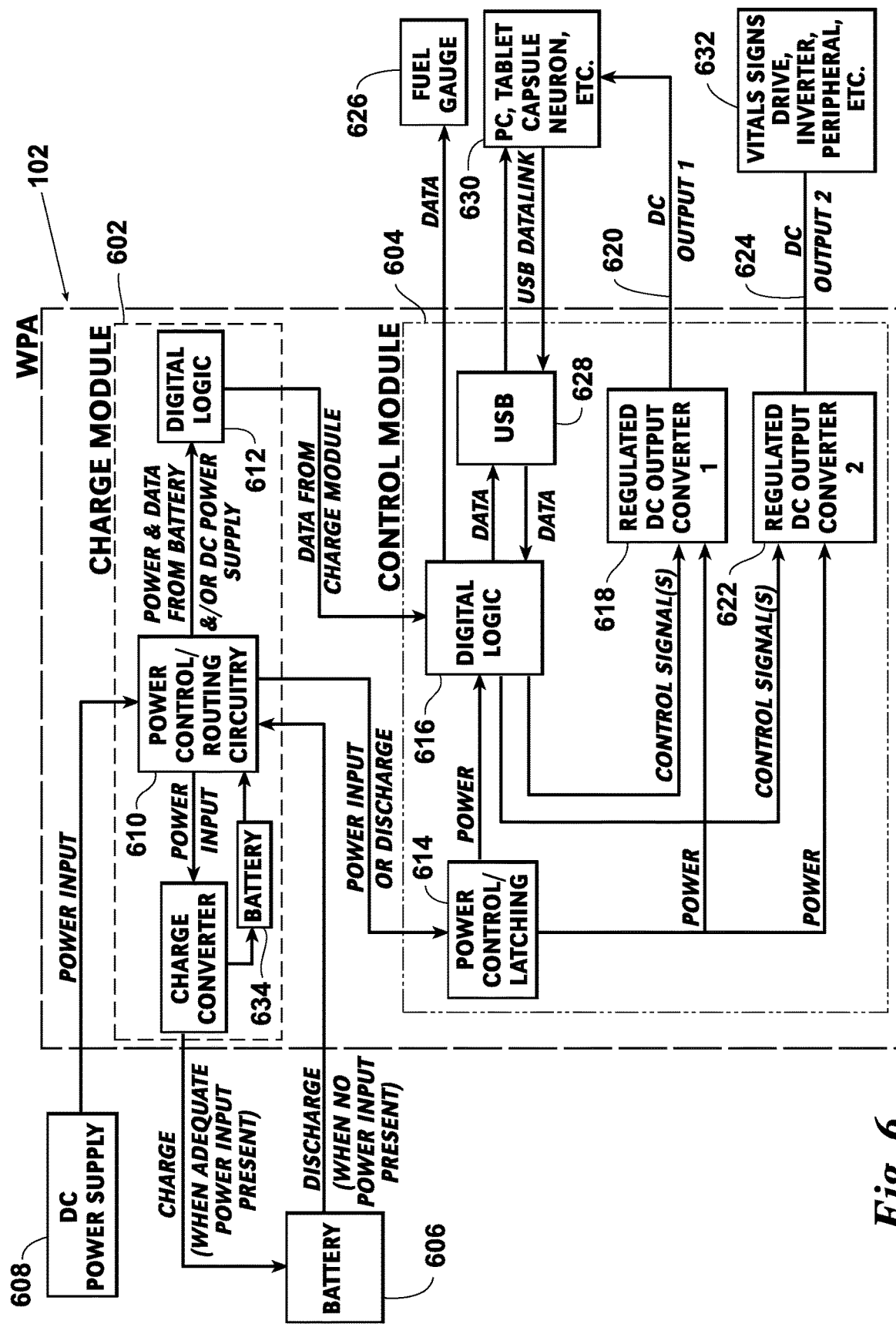
FIG. 6 depicts a block diagram of the power management circuitry employed in certain preferred embodiments of the present invention.

A block diagram of the circuitry of a preferred power system 102 is shown in FIG. 6. Functionally, the circuitry can be divided into two modules: 1) the charge module 602; and 2) the control module 604. The charge module 602 controls the flow of electrical power (at 610) to and from external battery 606 based on the presence of external power from a DC power supply 608 which is powered from an AC wall outlet and the amount of charge in battery 606. Likewise, charge module 602 controls the flow of electricity to and from internal battery 634, if present. Optional internal battery 634 preferably provides power for very brief periods while external batteries are changed, thus allowing "hot swaps" of the battery. Charge module 602 recharges internal battery 634, as needed, either from DC power supply 608, when available, or from battery 606. Power, either from battery 606, internal battery 634, or power supply 608 is forwarded to control module 604. Charge controller 602 also includes digital logic 612 which collects information from battery 606 and from the routing circuitry 610 and forwards the information to control module 604.

Control Module 604 includes power control circuitry 614 which routes electrical power to the various systems of control module 604; a first DC/DC convertor 618 for providing a first DC output 622, a second DC/DC converter 622 for providing second DC output 624, digital logic 616 which receives power from circuitry 614 and activates or deactivates converter 618 and 622 as dictated by the operator and the charge status of battery 606 as well as providing data to optional remote fuel gauge 626 and communicating with the external computer 630 via a USB interface 628. As will be apparent to one of ordinary skill in the art, the term "digital logic" as used herein will encompass programmable devices such as, by way of example and not limitation, a microprocessor, microcontroller, FPGA, or the like, as well as other logic devices.

DC/DC converters are well known in the art. Such converters may take an unregulated input voltage which may vary over time, such as the output of a battery, and provide a regulated DC output at a stable voltage regardless of the input voltage, at least within reason. In battery operated systems, switch mode regulators are commonly employed because of their relatively high efficiency, as compared to linear regulators. Such converters may provide an output voltage lower than the input voltage, commonly known as a "buck" regulator, at a voltage higher than the input voltage, commonly known as a "boost" regulator, or at a voltage that may be lower than the input voltage when the battery is fully charged or higher than the input voltage as the battery discharged, commonly referred to as "buck/boost" regulators.

In a typical application, a workstation computer may require 19 volts DC while a medical device may require 12 volts DC. By way of example and not limitation, other common configurations might include: two 12 volts outputs, two 19 volt outputs; a 12 volt output and 120 volts AC; and a 19 volt output along with 120 volts AC output. In the preferred embodiment, the converters and inverter can be configured to meet the needs of any particular application and it is understood that any such combinations are contemplated within the present disclosure.

In a preferred embodiment, output 620 may be used to drive the computer or user interface 630 and the other output 622 may be used to power monitoring equipment such as vital sign monitor, or other peripheral, 632. Of course, for workstations using other equipment, the power outputs would be configured appropriately. While the above embodiment of the power system circuitry was described as having two DC outputs 620 and 622, the invention is not so limited. Depending on the workstation, any number of outputs may be appropriate and in some cases, an inverter, or DC/AC converter, may be appropriate where equipment included on the workstation was designed for AC power only.

As is well known in the art, some battery chemistries do not fare well when fully discharged, in particular lithium ion batteries. Thus, in one preferred embodiment, when the battery 606 reaches a minimum charge, control module 604 disables outputs 620 and 624 to prevent damage to battery 606. In another preferred embodiment electrical power is removed from all workstation equipment except the computer so that the automatic shut-down can be displayed to the user. When the battery reaches yet a predetermined lower level of charge, the power to the computer is also disabled.

Figure 7:
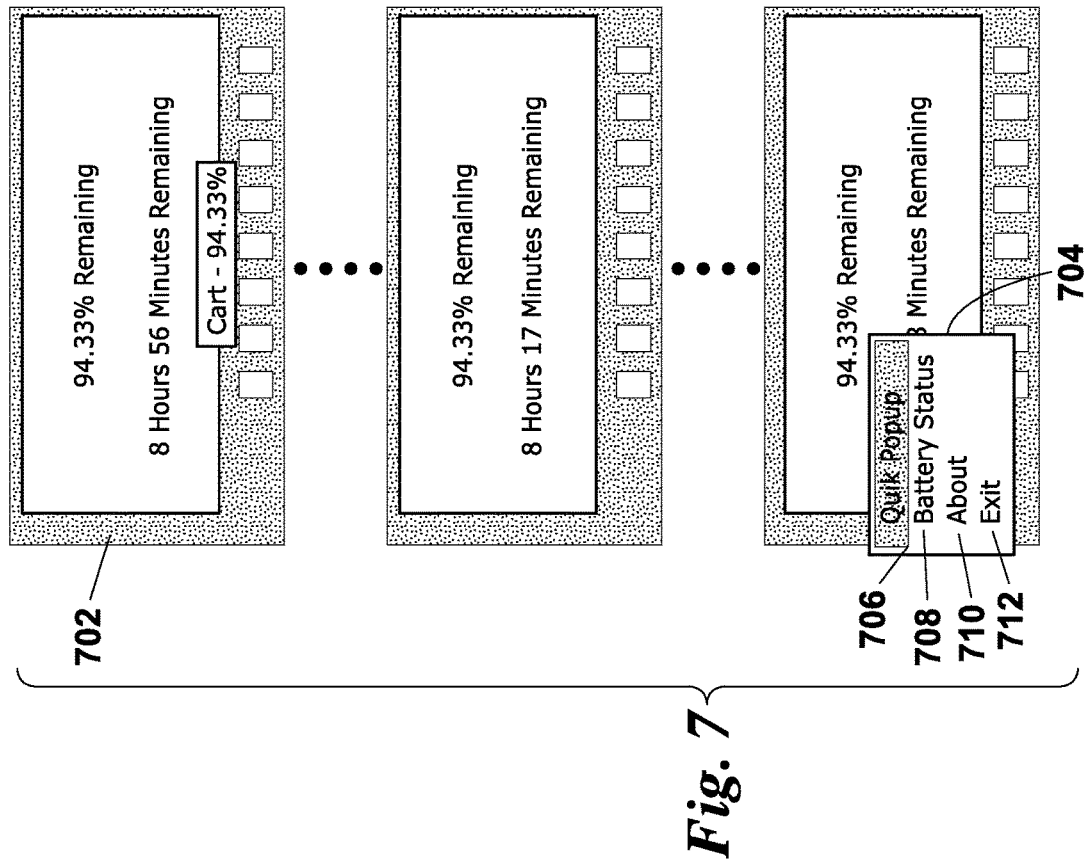
FIG. 7 depicts popup displays which would be presented to the operator of the workstation in one preferred embodiment of the inventive system.

With reference to FIG. 7, preferably, in an embodiment utilizing an interface to the workstation computer (i.e. the USB interface 420 of FIG. 4), the inventive system will include a software application running on the workstation computer which monitors the battery, maintain a reference database of batteries used on the system, and displays the charge remaining, the health of the battery, and other battery details on the workstation display. In one preferred embodiment, when the mouse is rolled over an icon in the system tray, or the icon is clicked on, (on a computer running the Windows operating system) a popup 702 displays the percentage charge remaining and time of operation remaining, assuming the battery load remains unchanged. Additionally, when the right mouse button is clicked, or optionally when the cursor loiters on the icon, a second popup 704 is displayed offering the user several options, such as, by way of example and not limitation, a more detailed "quick popup" 706, a battery status screen 708, information about the system 710, or an opportunity to exit the program 712.

Figure 8B:
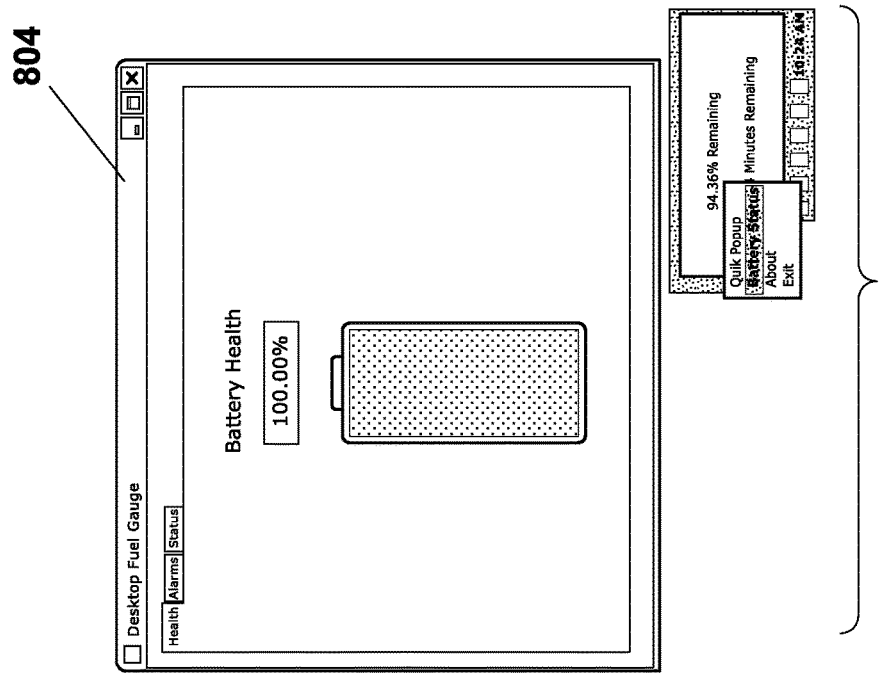
FIG. 8B depicts batter health status displays presented to the operator in a preferred embodiment of the present invention.
Figure 8A:
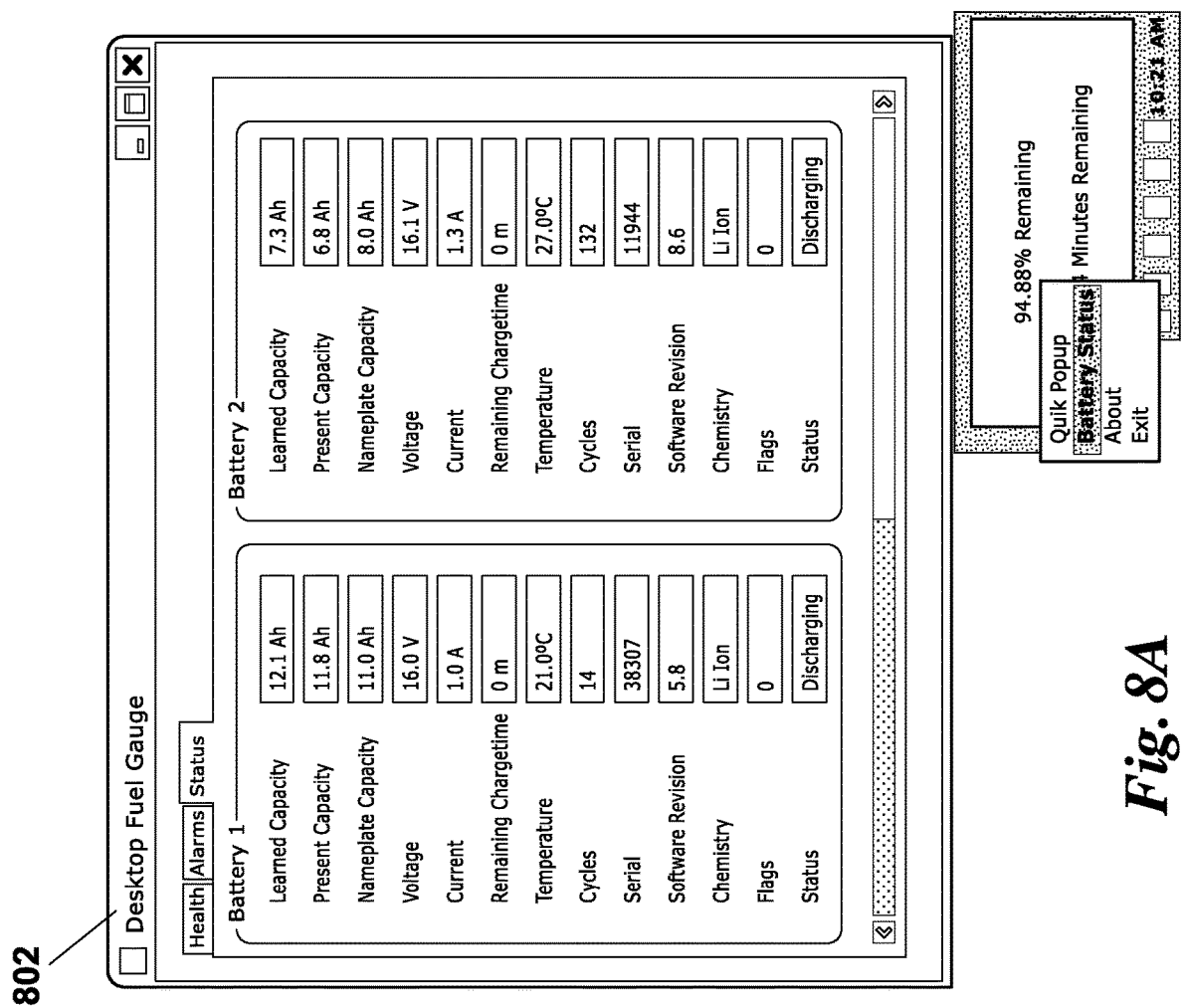
FIG. 8A depicts battery status displays presented to the operator in one preferred embodiment of the present invention.

With further reference to FIG. 8A, for each battery, the software tracks characteristics and environmental conditions such as, by way of example and not limitation, learned capacity as determined by the system by monitoring the battery during use, present capacity, specified capacity, voltage as measured by the system, current being provided by the battery as measured by the inventive system, remaining charge time at the present rate of discharge, the number of charge/discharge cycles recorded on this battery, the battery serial number, the software revision of the circuitry in the battery, the chemistry of the battery, any warnings from the battery, the battery's present status either charging, discharging, or idle and the like. In a preferred embodiment, this screen is displayed if the user clicks on option 708. As will be apparent to one of ordinary skill in the art, several of the indicated fields either have to be read from the battery or input by the operator the first time the battery is attached. Preferably, batteries used with the present invention will have battery information stored within the battery and readable by the inventive system. A number of schemes could be used to read such information such as, by way of example and not limitation, a conventional serial bus, a SPI bus, IIC bus, a one-wire bus, a wireless interface, or any other electronic communication scheme. Presently there are virtually limitless possibilities for communications between a consumable product and its host system. Many of such schemes are subject to industry standards while other tend towards being proprietary. Any scheme which allows the battery to provide data to the system will suffice.

In another preferred embodiment, the information needed for the display of FIG. 8A is sent from the workstation to service personnel, preferably wirelessly. Thus technicians can ascertain the condition of batteries and plan recharging and battery maintenance or replacement in accordance with the condition of individual batteries.

Also available for viewing after clicking battery status option 708 is a battery health screen 804 as depicted in FIG. 8B. Battery health is an indication of the overall remaining life of the battery, as opposed to the amount of remaining charge, or a prediction of the number of charge/discharge cycles the battery may be expected to take before replacement or repair. Battery health may be estimated from the number of charge/discharge cycles along with the ratio of learned capacity to nameplate capacity, and the measure voltage at a given load. The operator can use this measure to remove a battery from service before it causes premature shut down or other issues with the workstation.

Figure 9:
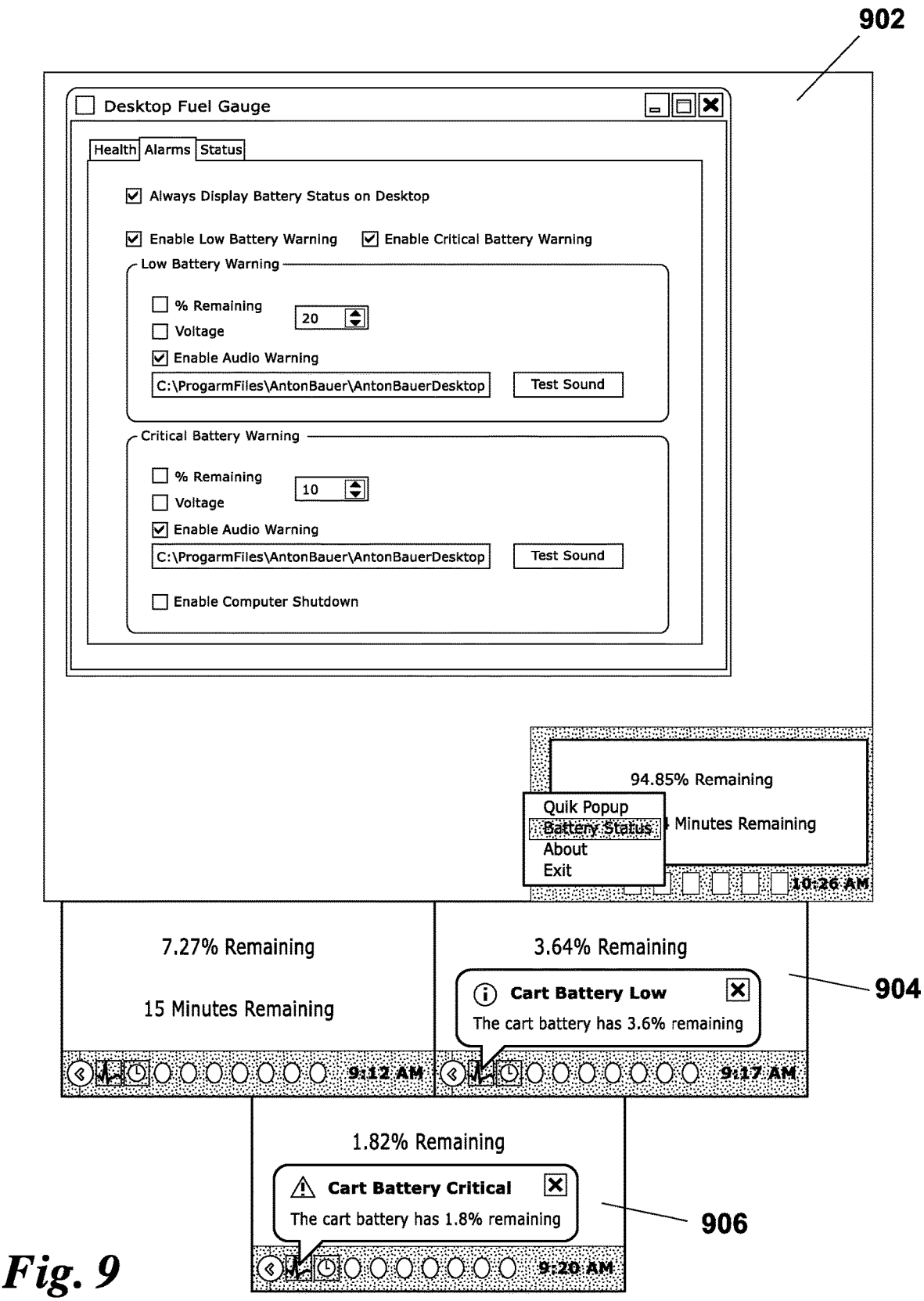
FIG. 9 depicts displays for the management of low battery alerts and the presentation of low battery alerts on one preferred embodiment of the present invention.

With further reference to FIG. 9, through screen 902, the user may select the precise battery conditions which will generate a warning and how the operator will be alerted, visually and/or aurally. Thus when the battery reaches a first specified level of charge, as shown by way of example at 904, a battery low indication is present on the screen, and possibly an aural alert is generated. As the battery approaches a second discharge threshold, a critically low indication is presented on the screen 906, along with an aural warning if so selected.

Figure 12:
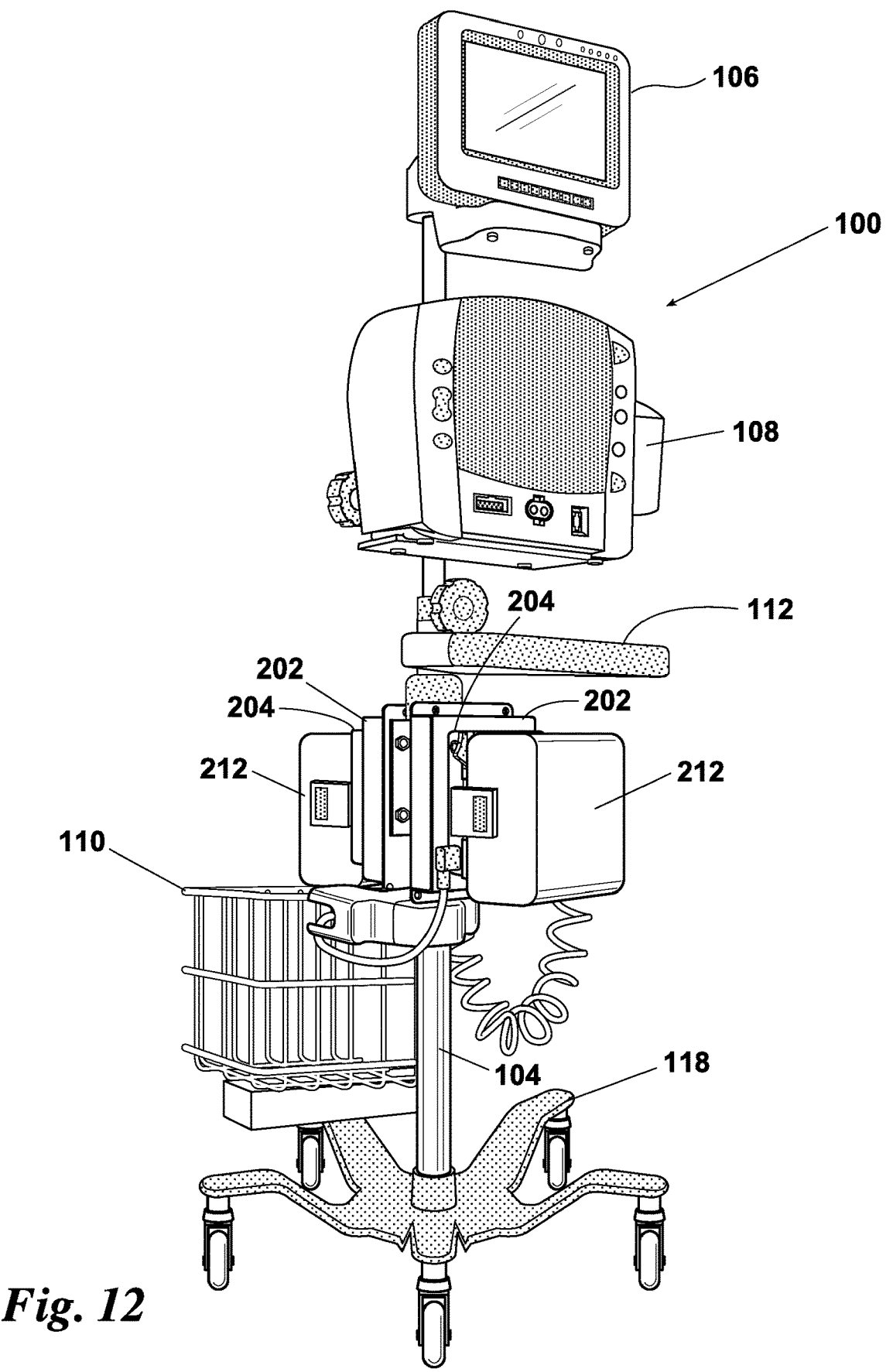
FIG. 12 shows the present invention having a second removable battery in its general environment.

In another preferred embodiment, two external batteries are employed to provide longer uninterrupted operation of the workstation. With reference to FIG. 12, workstation 100 includes: a cart 104; a processing system 106, data collection system 108, and a power system. Cart 104 typically includes a handle 112 and possibly a basket 110.

The power system includes a pair of housings 212 which attach to workstation 100 and support batteries 212 secured in mounts 204. The circuit of workstation 100 is identical to that of the workstation of FIG. 1 except charge module includes circuitry for charging the second battery and for selectively controlling and routing the electrical output of the second battery. With a second battery, not only is the time of continuous operation extended, there is less reliance on the internal battery during battery exchanges.

Figure 10:
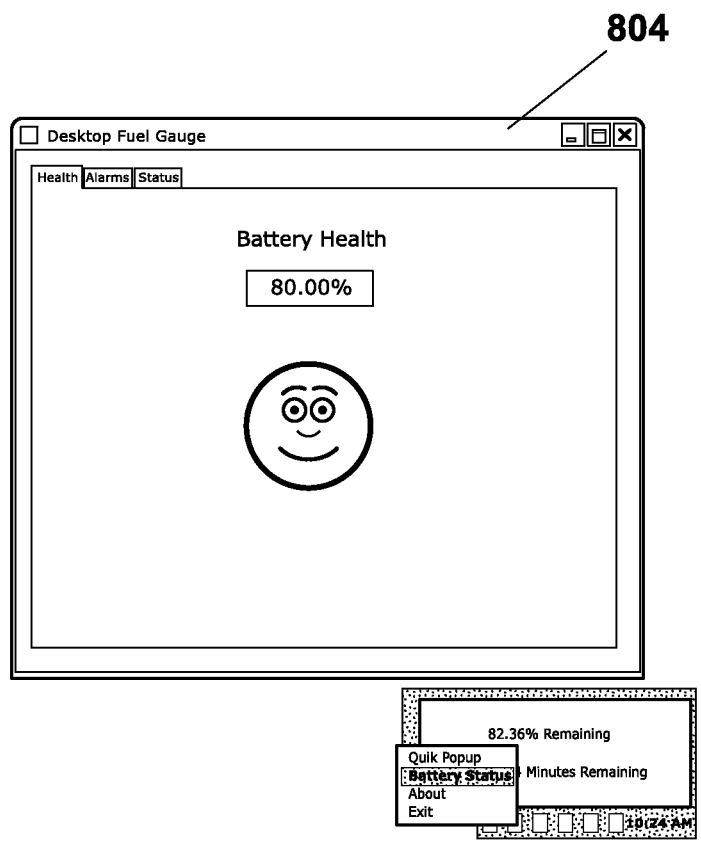
FIG. 10 depicts a display of battery condition using the WONG-BAKER FACES® Pain Scale.
Figure 11:
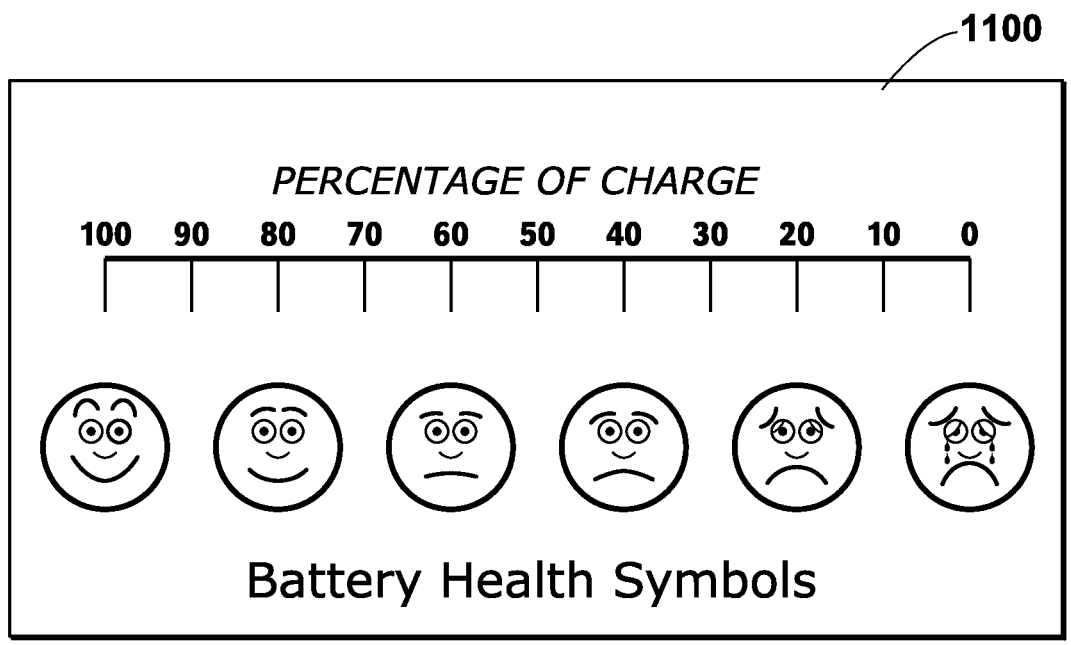
FIG. 11 provides an example of battery condition versus the faces of the WONG-BAKER FACES® Pain Scale.

Turning to FIGS. 10 and 11, in another preferred embodiment the inventive power system provides an indication of battery charge using the WONG-BAKER FACES® Pain Scale 1100 for indicating battery status. The pain scale is familiar to nurses and medical technicians and thus provides an intuitive indication of battery condition. Typically the appropriate pain face would be displayed locally on the workstation computer in lieu of a gauge or percentage. However, it should be noted that battery condition may instead be sent wirelessly to service personnel or to the battery manufacturer.

In a single battery system, the translation from remaining charge to the appropriate face is fairly straight forward. For example, each face might represent a change of roughly 20 percent in usable charge. With multi-battery systems, the determination of the appropriate indicator becomes a little more complex. By way of example and not limitation the face could be chosen based on the battery with the greatest charge. The disadvantage to this system is that there is no reserve charge left when the last face is used. At the opposite end of the spectrum, the face could be chosen based on the battery with the least amount of charge, the disadvantage being that this scheme would likely result in premature battery changes. Typically an algorithm would be selected somewhere in between such that the display would be based on the collective charge of the batteries. Obviously this algorithm could become rather complex if the system allows the use of batteries having different capacities and batteries of varying chemistry.

With this in mind, a nurse using the inventive workstation would likely expect to have about 80 percent of total time of use remaining when face 804 is displayed on the monitor. It should be noted that a linear scale is used by way of example and not limitation, it is likely that in many areas applying a log scale to the various faces would improve the "feel" of the battery condition monitor. Offsetting the top of the scale might also improve the user experience. For example, the leftmost face of FIG. 11, 1100 might indicate the first 50 percent of battery charge while the remaining five face indicate the last half of the remaining charge. Thus, the Wong-Baker pain faces scale provides an intuitive user interface regardless of the time remaining, or charge, associated with any particular face.

While preferred embodiments of the invention have been described herein, many variations are possible which remain within the concept and scope of the invention. Such variations would become clear to one of ordinary skill in the art after inspection of the specification and the drawings.

What is claimed is:

1. A workstation power system comprising:
    a housing configured for attachment to a workstation;
    a first battery mount secured to said housing for releasably receiving a first battery;
    a first battery receivable in said first battery mount;
    a first DC-to-DC converter housed in said housing, said first DC-to-DC converter in communication with said first battery to produce a first direct current output for providing power to a first component of the workstation and a second DC-to-DC convertor to produce a second direct current output for providing power to a second component of the workstation;
    a charging circuit housed in said housing, said charging circuit having an input for receiving a charging power and said charging circuit in communication with said first battery to charge said first battery;
    wherein the workstation power system is configured for attachment to a workstation having a single computer configured for external interface and with a communication port for receiving information from the power system, wherein the power system is in communication with the communication port such that said computer monitors the condition of said first battery;
    said single computer including a display and said single computer configured to display said condition of said first battery on said display.

2. The workstation power system of claim 1 further comprising:
- a second battery mount secured to said housing for releasably receiving a second battery;
- a second battery receivable in said second mount;
- said first and second DC-to-DC converters in communication with said first and second batteries to selectively draw power from either said first or second battery to produce said first and second direct current outputs;
- said charging circuit in communication with said first and second batteries to selectively charge said first and second batteries based on the amount of charge in each battery and the amount of said charging power available;
- wherein said single computer monitors the condition of said second battery via said communication port.

3. The workstation power system of claim 1 further comprising an internal battery housed in said housing, said internal battery in communication with said first and second DC-to-DC converters such that said internal battery provides electrical power to produce said first and second direct current outputs when said first battery is not received in said first mount and wherein said internal battery is charged from said first battery when said first battery is received in said mount.

4. The workstation power system of claim 1 wherein said first direct current output is 19 volts.

5. The workstation power system of claim 4 wherein said second direct current output is 19 volts.

6. The workstation power system of claim 4 wherein said second direct current output is 12 volts.

7. The workstation power system of claim 1 wherein said first and second direct current outputs are 12 volts.

8. The workstation power system of claim 1 further comprising an inverter receiving power from said first battery to provide an alternating current output at 120 volts.

9. The workstation power supply of claim 1 wherein said condition of said first battery is displayed using the WONG-BAKER FACES® Pain Scale.

10. A method for providing electrical power to a workstation having a single computer with a display, the method including the steps of:
   (a) providing a housing attached to the workstation;
   (b) providing a battery mount on said housing;
   (c) releasably receiving a battery in said mount;
   (d) providing circuitry in said housing for producing a first direct current output and a second direct current output, said first and second direct current outputs configured to provide a substantially constant DC voltage as said battery discharges; and
   (e) outputting said first voltage to the single computer to provide primary power to operate the single computer;
   (f) the single computer being configured for external interface and including a port for receiving a communication from said circuitry for monitoring a condition of said battery with said circuitry of step (d);
   (g) communicating said condition to said computer;
   (h) providing an indication of said condition on said display.

11. The method of claim 10 wherein step (h) uses the WONG-BAKER FACES® Pain Scale to provide the indication of said condition.

12. The method of claim 10 further including the step of:
   (i) disabling said first and second direct current outputs if said condition is less than a preselected value.

* * * * *